(No Model.)

J. A. PEARCE.
CULTIVATOR.

No. 399,628. Patented Mar. 12, 1889.

Witnesses
Arthur C. Denison
George Clapperton

Inventor,
Joseph A Pearce
By his Attorney
Edward Taggart

UNITED STATES PATENT OFFICE.

JOSEPH A. PEARCE, OF GRAND RAPIDS, MICHIGAN, ASSIGNOR OF ONE-HALF TO MILO B. STEWART, OF SAME PLACE.

CULTIVATOR.

SPECIFICATION forming part of Letters Patent No. 399,628, dated March 12, 1889.

Application filed July 9, 1888. Serial No. 279,446. (No model.)

*To all whom it may concern:*

Be it known that I, JOSEPH A. PEARCE, a citizen of the United States, residing at the city of Grand Rapids, in the county of Kent and State of Michigan, have invented a certain new and useful Cultivator, of which the following is a specification.

My invention relates to a cultivator having a center or body and two detachable wings hinged to the body in the manner and for the purposes herein described; and the objects of my invention are, first, to enable the operator to cultivate close to the rows of trees, berry-bushes, and the like; second, to equalize the draft by means of the two wings, each placed equidistant from the center of the body; third, to provide reversible wings, in order to turn the soil toward or away from the rows of trees; fourth, to hinge the wings to the body, so that each wing may be turned up and over the body, and, fifth, to enable the user to shift the wings to a central position in the rear of the supporting-wheels. These objects I accomplish by means of the mechanism illustrated in the accompanying drawings, in which—

Figure 1:
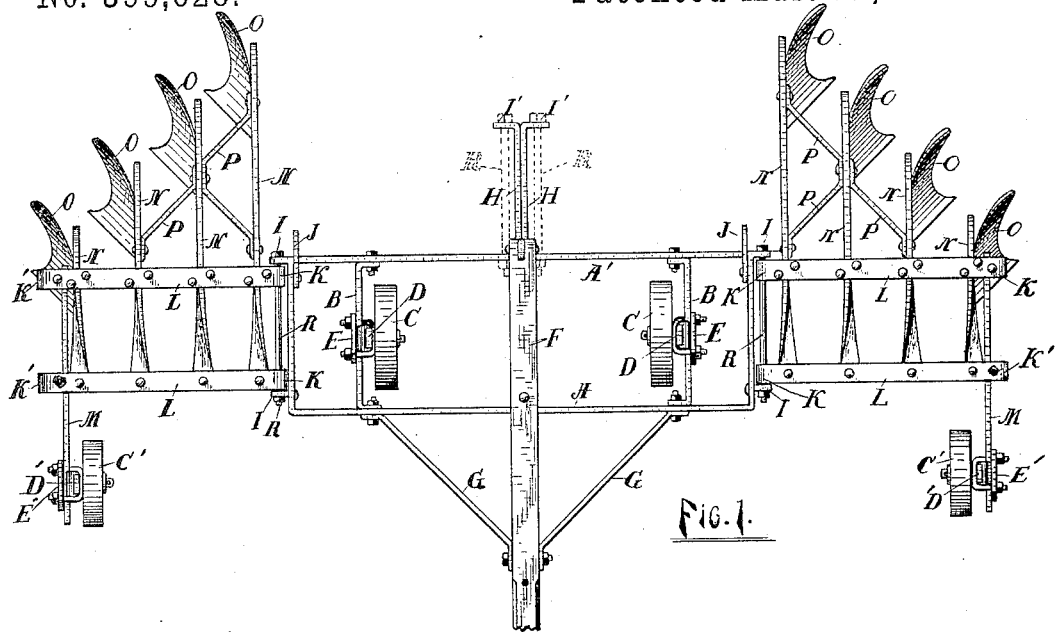
Figure 2:
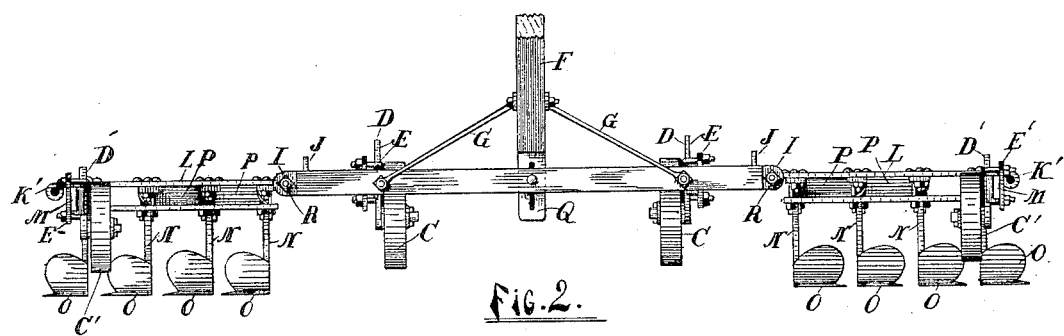
Figure 3:
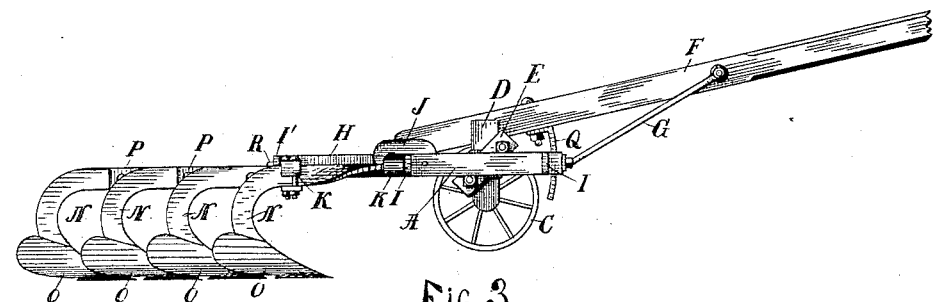

Figure 1 is a plan view of a cultivator constructed in accordance with my invention, having the wings carrying the cultivator-teeth attached to the outer sides of the body of the cultivator. Fig. 2 is a rear elevation of the same, and Fig. 3 is a perspective view of my cultivator with one wing removed and with one wing attached in the rear of the body of the cultivator.

Similar letters refer to similar parts throughout the several views.

The body of the cultivator is preferably composed of iron, but may be of any suitable material. It consists in the front piece, A, and the rear piece, A', with end pieces, as shown. Strong bars B B connect A and A', and are securely fastened thereto by bolts or other suitable attachment. To the cross-bars B B are attached the supporting-wheels C C. Each wheel C is provided with a clevis, D, and connecting-plate E, by means of which it is securely attached to the cross-bar. I prefer to make this attachment after the manner of attaching colters to ordinary plows, which is shown in Fig. 3. This allows for vertical adjustment of the supporting-wheels. At either outer side of the body I provide two lugs, I I, with openings for the reception of the bolts R R, by means of which the wings are attached to the body. The wings are constructed alike, so that one description will answer for both.

L L represent the front and rear frame of the wing, which is connected together by means of the bars N N N, &c., which bars also form the shank for the teeth.

P P, &c., are braces for strengthening the frame-work of the wings.

O O O, &c., are the cultivator-teeth, which teeth are attached to the bars N N N. Each wing is provided with a bar securely attached, (shown by M,) designed to support the wheel C'. The wheel C' is attached to M preferably by means of a clevis, D', and plate E'.

K K and K' K' are eyelets or bolt-holes in the bars L L, designed to receive the bolts R R. When the cultivator is to be used extended, as shown by Fig. 1, and to throw the earth toward the rows of trees, the bolt R for each wing passes through the lugs I I on the cultivator-body and the eyelets R R of the bars L L. If the user desires to throw the earth from the rows of trees, he merely reverses the position of the wings, when the bolt R passes through the lugs I I and the eyelets K' K'.

In using the cultivator with the wings attached to the outer extremities of the cultivator-body the center between the wings is not cultivated, and when the cultivator is desired to cultivate in the center the wings may be removed and attached to the rearward projections, H H.

In Fig. 1 I have shown by dotted lines the bolts R R when fastening the wings to the projections H H. It will be seen that the bolts R R pass through the lugs I' I' and through the eyelets K K or K' K' and the bar A'. The wings can be reversed as well when attached to the projections H H as when attached directly to the extremities of the body.

When the wings are attached to H H, the wheels C' C' are removed, as they would be of no use when the wings were so attached. The wings, being hinged to the body, can be turned up and fastened together, so that the cultivator can easily be moved from place to place and can be turned around in a small space.

I attach the tongue F to the back piece, A', by a bolt, upon which the tongue may turn freely.

The front piece, A, is provided with a slot. (Not shown in the drawings.)

Q is a bent arm passing through the slot in A, and is firmly bolted to the tongue, as shown in Fig. 3. A pin (shown in Fig. 2) is used to adjust and hold the arm in any required position, the object being to adjust the cultivator-teeth to cultivate to any required depth.

In the drawings I have shown a form of tooth ordinarily used on a gang-plow; but any form of tooth may be used in connection with my invention.

It has been found desirable among fruit-growers and gardeners to so prune their trees as to allow the limbs to grow close to the ground, and the great objection to such training has been the difficulty in properly cultivating the orchards. By my invention such difficulty is entirely overcome. The wings of the cultivator extend beyond the path of the horses, and will cultivate beneath the limbs of the trees, however low they may be.

The supporting-wheels are placed in front of the cultivator-teeth, so that they always travel on the uncultivated portion.

Having thus described my invention, what I claim to have invented, and desire to secure by Letters Patent, is—

1. In a cultivator, the central body supported on wheels, in combination with wings hinged to either side of said body, and supporting-wheels for said wings placed in front of the cultivator-teeth and within the space covered by the cultivator, substantially as described.

2. In a cultivator, the central body, in combination with detachable wings, one on each side, said body provided with lugs and bolts for attaching the wings to said body, said wings adapted to be attached to the extreme outside of the body when cultivating at a distance from the center line of the body and to be attached to the rear of the body, in order to cultivate the space passed over by said central body, substantially as described.

3. The combination, with the body provided with the extremes H H and lugs I I and I' I', of the wings bearing the teeth O O O, &c., and provided with bolt-holes K K and K' K' and the bolts R R, said wings adapted to be attached to either side of the body at points most distant from the tongue and to the projections H H, substantially as described.

In witness whereof I have hereunto set my hand and seal in the presence of two witnesses.

JOSEPH A. PEARCE. [L. S.]

Witnesses:
EDWARD TAGGART,
HARRY P. VAN WAGNER.